United States Patent [19]
Cash et al.

[11] 3,760,418
[45] Sept. 18, 1973

[54] N-ELEMENT GLINT SIMULATOR

[75] Inventors: Carlton H. Cash, Hazel Green; James J. Jernigan, Huntsville, both of Ala.

[73] Assignee: The United States of America as represented by the Secretary of the Army, Washington, D.C.

[22] Filed: Apr. 17, 1972

[21] Appl. No.: 244,687

[52] U.S. Cl. .............. 343/18 E, 35/10.4, 343/17.7, 343/18 D
[51] Int. Cl. ............................................. G01s 9/02
[58] Field of Search .............. 343/18 E, 18 D, 17.7; 35/10.4

[56] References Cited
UNITED STATES PATENTS

| | | | |
|---|---|---|---|
| 3,568,194 | 3/1971 | Wilson et al. | 343/18 E |
| 3,158,862 | 11/1964 | Chisholm | 343/18 D |
| 3,699,575 | 10/1972 | Peters, Jr. et al. | 343/18 D |

Primary Examiner—Malcolm F. Hubler
Attorney—Harry M. Saragovitz et al.

[57] ABSTRACT

A glint simulator is disclosed for receiving and reflecting impinging radar energy to simulate the results of a real target. This allows ready monitoring of a radar response to angle and amplitude scintillation error. A single point source of angle scintillation or glint from the simulator may comprise a microwave antenna, a modulator, a noise modulation source and a modulation phase adjustment. Several simulator point sources may be utilized with a single noise modulator to provide a variable multiple-point target. Simulator antennas receive the radar energy, couple it through respective modulators wherein noise modulation may be introduced to reduce or enhance the energy, and reflect it back to the radar.

3 Claims, 1 Drawing Figure

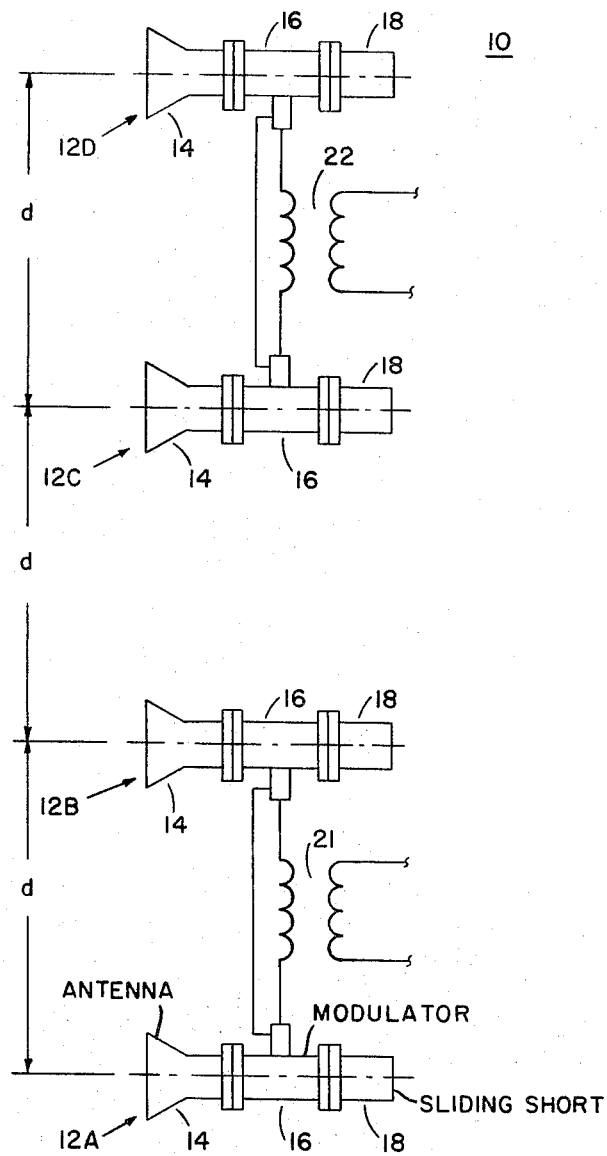

N-ELEMENT GLINT SIMULATOR

BACKGROUND OF THE INVENTION

In radar tracking of a target several measurement errors are encountered from characteristics of the target itself. Angular scintillation, glint, is the wandering of the center of reflection of a target from its effective center. This appears on a radar display as an apparent displacement of the target from its mean position. The displacement may consistently vary as is well known in the art. For targets of several wavelengths long, such as aircraft, the apparent radar mean position, center, will wander as the target rotates relative to the line-of-sight. When a target is in a radar short-range region, glint becomes a dominant problem for targets extending over several wavelengths. Radar echos received from a single target can be from several points on the target, indicating a rotating group of isolated points and disclosing an appparent multiple-point target. The reflecting points of a multiple-point target are fixed with respect to the target mean position but appear to wander relative to the radar line-of-sight. When uncompensated for, glint can cause a moving target to appear outside of the physical boundary, or extent, of the target.

SUMMARY OF THE INVENTION

The apparatus of the present invention is a device for providing glint, angle scintillation, of impinging radar energy to simulate apparent multiple-point targets. Received radar energy is amplitude and phase modulated by diode modulators specifically located to reflect the various energy levels back to the radar. Changing the phase or modulating noise levels for the modulator can cause shifting of the effective reflective points (simulator antenna) on the target, resulting in apparent displacement of the target center from its mean position.

BRIEF DESCRIPTION OF THE DRAWING

The single FIGURE is a diagrammatic view of a multiple-center target simulator.

DESCRIPTION OF THE PREFERRED EMBODIMENT

An N-element simulator may comprise from as few as two point sources to several point sources, depending on the surface of the actual target being simulated and the accuracy of simulation desired. The single FIGURE discloses a preferred embodiment of the invention wherein an N-element simulator 10 is disclosed having point sources 12A, 12B, 12C, and 12D. The sources 12 are arranged in a common plane for reflecting energy substantially along a planar path. Each point source 12 comprises an antenna 14 for receiving and re-radiating radar energy, a modulator 16 for modulating received radar energy, and a sliding short 18 for fine phase adjustment of the modulator. Radar energy impinging on antennas 12 is coupled into modulator 16, wherein the signal amplitude and phase is varied. The sliding short 18, a stub-waveguide, coupled to modulator 16 provides a highly reflective terminus for the radar energy and is tuneable for providing frequency adjustment. A noise modulation source 21 is coupled between the modulator of point sources 12A and 12B for providing a variable noise level to the modulators. This noise level imposes a modulation onto the radar energy, resulting in a distorted, reradiated signal. Similarly, a noise modulation source 22 is coupled between the modulators of point sources 12C and 12D for distorting energy re-radiated therefrom.

In operation, the glint simulator simulates the effects of scintillation on a radar system. It can be used as a laboratory tool or can be employed in field testing of radar systems. Incident energy from a tracking radar is intercepted by the glint simulator antennas 12. If no modulation is applied to modulator 16, almost all of the intercepted energy is re-radiated back to the radar, indicating a target or targets of several points in space which are fixed with respect to each other. The amplitude of re-radiated energy is controlled by introducing a modulating voltage or a dc bias into modulator 16. The waveguide stub 18 affords an adjustable short circuit for the radar frequency and reflects the radar energy back through the modulator, where it is coupled to and re-radiated by the antenna.

The point sources 12, repeaters, are separated by an arbitrary distance d, which may be determined by the target dimensions or previous signals obtained from such target dimensions which indicate maximum point sources. The target 10 cross-section is determined primarily by its antenna physical aperture, and gain in the direction of the radar. When a noise modulation that is 180° out of phase with the received signal energy is applied to point sources 12, the apparent phase center of the simulated target wanders. The individual targets, then, appear to vary in relative position. For a two-center target only two point sources 12 represent the target. A modulation signal 180° out of phase with the radar frequency causes the phase center of the simulated target to wander from one side to the other, sometimes appearing as one target and again as two for which the radar must compensate.

Modulator 16 can be a p-i-n (intrinsic-barrier diode) diode modulator similar to the Hewlett Packard 5082-3000 series or other highly efficient microwave semi-conductor diode circuits for modulating or switching microwave signals. When active, the modulator causes the reflected signal to appear as a static reflection from the target.

Noise sources 21 and 22 provide random inputs to modulator 16 allowing random amplitude and phase fluctuation in the reflected signal. By properly shaping the noise spectrum, desirable target characteristics are introduced. The particular noise source is selectable. Independent noise sources can be used with each point source, or a phase shift network coupled back to common reference signal can supply all of the point sources, for example.

Utilizing the glint simulator, for testing a radar system, allows rapid determination and adjustment of the range over which a radar will compensate for target induced scintillation errors. The degree of scintillation compensation by installed radars may be readily verified and routinely checked.

Obviously many modifications and variations of the present invention are possible in the light of the above teaching. For example, a traveling wave tube amplifier can function as the modulation element. However, for this case, isolation is required between input and output to avoid unwanted parasitic oscillation, Thus, a single receiving antenna can be used to couple received energy through an isolator to the modulators for re-radiation from respective modulator antennas. The basic principle remains the same — modulation and spatial separation of reflected input to simulate target glint. It is therefore to be understood that within the scope of the appended claims the invention may be practiced otherwise than as specifically described.

We claim:
1. A glint simulator comprising: a plurality of radar antennas spaced apart for receiving and re-radiating radar energy as controlled point sources; controlling means coupled to each of said radar antennas for modulating said received energy prior to re-radiation thereof, said controlling means are p-i-n diode modulators for modulating said incident radar energy; noise modulation means common to said controlling means; and a sliding short connected to each of said modulators for fine phase shifting of said radar energy.

2. A glint simulator as set forth in claim 1 wherein said noise modulation means is a transformer having the secondary thereof coupled to said diode modulators.

3. A glint simulator as set forth in claim 2 wherein said plurality of radar antennas are first and second point source antennas, and said transformer secondary is a single secondary connected in series with said diode modulators.

* * * * *